United States Patent [19]

Zeyfang et al.

[11] Patent Number: 5,613,615
[45] Date of Patent: Mar. 25, 1997

[54] VENTING CAP FOR MASKING

[75] Inventors: Frederick W. Zeyfang; Michael W. Jodon, both of Erie, Pa.

[73] Assignee: Bunzl Plastics, Incorporated, St. Louis, Mo.

[21] Appl. No.: 507,522

[22] Filed: Jul. 26, 1995

[51] Int. Cl.$^6$ .............................. B65D 51/16; B65D 59/06
[52] U.S. Cl. ..................... 220/203.11; 137/843; 137/860; 138/96 R; 220/203.09; 220/366.1; 220/368; 220/747
[58] Field of Search ........................ 220/203.01, 203.19, 220/203.27, 203.29, 352, 356, 366.1, 367.1, 368, 374, 720, 721, 745, 747, 89.1, 203.11, 203.09; 215/228, 260, 270, 271, 307, 381, 902; 138/89, 89.1–89.4, 96 R, 93; 137/800, 860, 843, 232; 277/212 FB, 29; 200/302.1, 302.2

[56] References Cited

U.S. PATENT DOCUMENTS

| | | |
|---|---|---|
| 2,254,557 | 9/1941 | Wittenberg ...................... 137/843 X |
| 2,436,291 | 2/1948 | Daniel . |
| 2,841,166 | 7/1958 | Auzin . |
| 3,189,210 | 6/1965 | Heisler ..................................... 215/260 |
| 3,387,765 | 6/1968 | Davis . |
| 3,437,224 | 4/1969 | Williams . |
| 3,606,001 | 9/1971 | Talonn et al. . |
| 3,927,798 | 12/1975 | Loomis . |
| 4,204,606 | 5/1980 | Micheli ..................................... 215/307 |
| 4,335,756 | 6/1982 | Sharp et al. . |
| 5,071,017 | 12/1991 | Stuli . |
| 5,203,825 | 4/1993 | Haynes et al. . |
| 5,280,809 | 1/1994 | Tive . |
| 5,377,854 | 1/1995 | Cusack . |

Primary Examiner—Allan N. Shoap
Attorney, Agent, or Firm—Oliff & Berridge

[57] ABSTRACT

A venting cap assembly is secured to a specific part of a component for masking the specific part. The cap assembly includes a closed first end, an open second end and a sidewall extending between the closed first end and the open second end forming an interior cavity for the specific part. At least one vent track extends along the sidewall within the cavity. The at least one vent track terminates at a pressure reservoir. A sealing and venting assembly periodically relieves air pressure within the pressure reservoir when an excessive amount of air pressure develops.

16 Claims, 6 Drawing Sheets

VENTING CAP FOR MASKING

BACKGROUND OF THE INVENTION

1. Field of the Invention

This invention relates to a venting cap for use in covering or masking a specific part, such as, for example, a tube or port, of a mechanical component during a high temperature processing operation such as, for example, painting, coating, plating and the like.

2. Description of Related Art

Mechanical components that are surface coated by, for example, painting or plating, often require that a specific part or feature of the component remain uncoated. Typically, a masking cap is used to cover the specific part of the mechanical component during the coating operation. Conventional masking caps, however, do not ensure that the specific part remains uncoated and free of any contaminants. These conventional masking caps are susceptible to leakage and removal under pressure.

The coating and other processing operations are often performed at high temperatures. During installation, the masking caps trap a certain amount of air when mounted on the specific part of the mechanical component. During the high temperature processing, the air that is confined within the cap expands. When this air expansion occurs, the cap can dislodge or blow off when excessive air pressure develops. The specific part is then exposed during further processing. As a result, the specific part may be subject to contamination or undesirable coating.

One solution for releasing excessive air pressure within the masking cap to prevent blow off is to add vents. These vented caps are open to the surrounding atmosphere. This arrangement, however, permits undesirable coating and other contaminants to leak onto the specific part under certain conditions. Typically, after the coating operation is completed, a negative air pressure develops within the cap and specific part during the cooling operation. This effect acts to draw contaminants including undryed coating onto the specific part.

The leaking and dislodging effects of the above-described masking caps can increase overall manufacturing costs. The specific parts that have been coated or contaminated must often be subject to additional processing to remove the coatings, etc. before use. Furthermore, the presence of this coating and contaminants may result in the complete rejection of the entire mechanical component when it is not possible or desirable to perform additional processing operations on the specific part.

Various venting cap assemblies for differing applications are known. For example, U.S. Pat. No. 2,841,166 to Auzin discloses a valve plug for an air-inflated object. The valve plug permits entry of air into the inflated object but prevents air from escaping.

U.S. Pat. No. 3,437,224 to Williams discloses a one-piece molded plastic closure provided with centering fins and stop elements that prevent the cap from completely sealing a tube opening. This arrangement allows the passage of air within the closure.

U.S. Pat. No. 3,927,798 to Loomis discloses a vented cap for a tank. The vented cap contains a spring bias baffle that permits venting in response to a sufficient build up of pressure within the tank.

U.S. Pat. No. 4,335,756 to Sharp et al. discloses a cover for enclosing an end of medical tubing. An interior of the cover includes a plurality of ribs that form a plurality of channels that permits the transmission of a sterilizing agent to enter the interior of the tubing.

U.S. Pat. No. 5,071,017 to Stuli discloses a valve closure for a hand-held dispenser. The valve closure includes a flexible diaphragm having a slit that opens upon the build up of sufficient fluid pressure within the dispenser produced by squeezing the dispenser.

U.S. Pat. No. 5,203,825 to Haynes et al. and U.S. Pat. No. 5,377,854 to Cusack disclose venting caps having one or more vent grooves therein to allow air to escape when the caps are at a first slidable position. Air is prevented from escaping when the caps are more fully inserted within the tubes.

U.S. Pat. No. 5,280,809 to Tive discloses a breather cap for protecting the ends of tubing during sterilization. The breather cap includes an inner passageway that directly connects the cap interior with the external environment.

SUMMARY OF THE INVENTION

The present invention has among its objects, the provision of a venting cap assembly for masking a specific part of a component during processing operations that does not dislodge or blow off when subject to a build-up of pressure within the component or the cap. Additionally, it is an object of the present invention to provide a venting cap assembly that does not leak contaminants onto the specific covered parts of the component.

The present invention is directed to a venting cap assembly that is used to cover a specific part or portion of a component. The venting cap assembly includes a closed first end and an open second end having a periphery. A side wall extends between the closed first end and the open second end. The ends and sidewall form an interior cavity sized to receive the specific part or portion of the component. The sidewall is generally in snug engagement with the specific part of the component.

The cap assembly contains at least one vent track that extends along the interior of the cap assembly from the closed first end to the open second end. The at least one vent track may also extend across the closed first end within the interior of the cap assembly. A sealing and venting membrane is positioned adjacent the periphery of the open second end. The sealing and venting assembly releasably engages the component and prevents the venting of air from the at least one vent track under normal pressure conditions. Upon the build-up of a sufficient air pressure within the venting cap assembly, the sealing and venting assembly is momentarily released from the component to release the build up of air pressure from within the cap assembly. After venting, the sealing and venting assembly reengages the component.

The venting cap assembly further includes a pressure reservoir positioned between the sealing and venting assembly and the at least one vent track. Air is allowed to build up within the pressure reservoir.

The venting cap assembly also includes a pressure assembly that presses the venting and sealing assembly against the specific part. The pressure assembly presses the venting and sealing assembly against the specific part when a negative air pressure develops in an interior cavity of the cap assembly. The pressure assembly includes a primary pressure pivot and a secondary pressure. A portion of the sidewall pivots about the primary pressure pivot and the secondary pressure pivot to press the venting and sealing assembly against the specific part.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
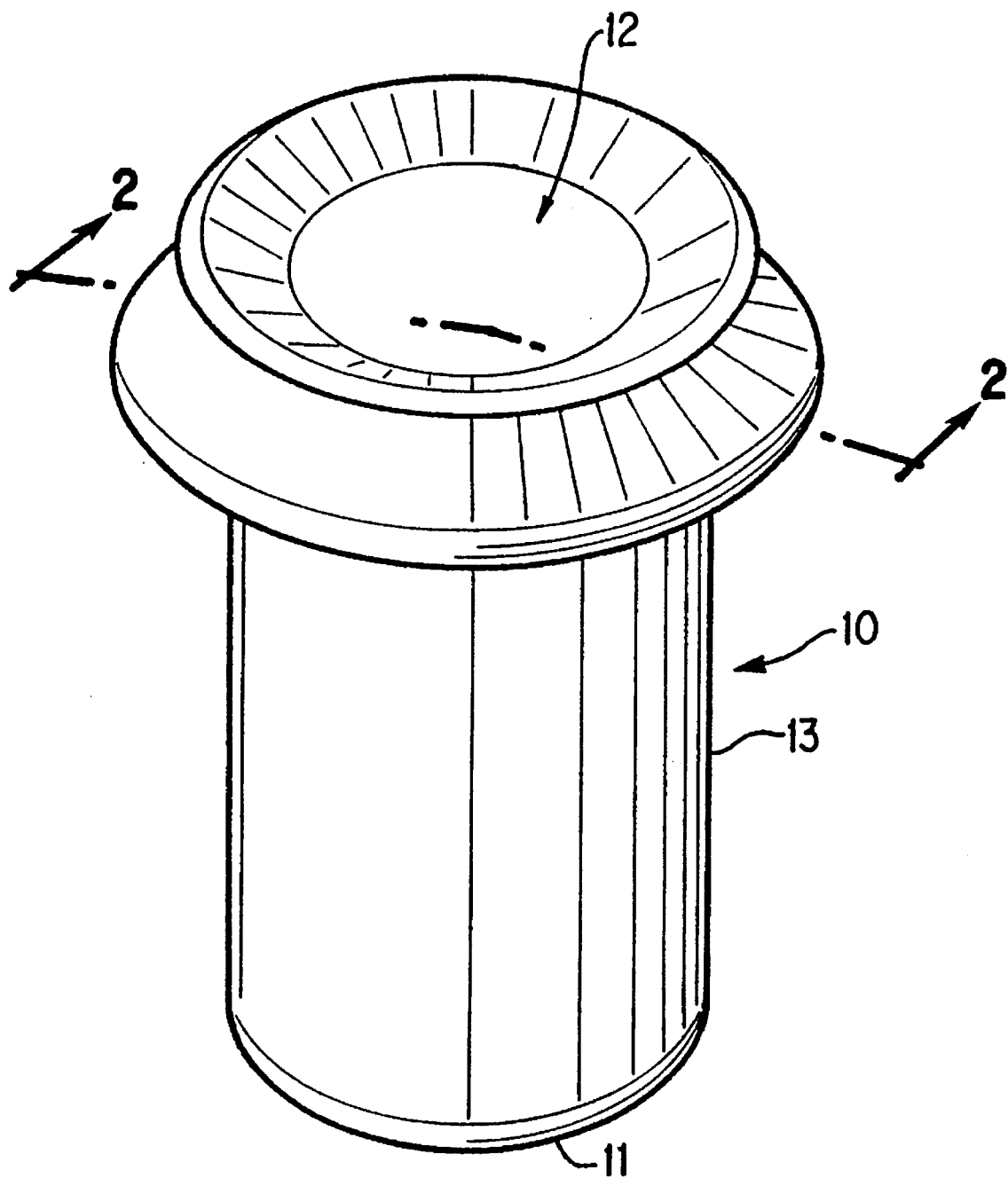
FIG. 1 is a pictorial view of an embodiment of a venting cap assembly of the present invention.

A venting cap assembly 10 according to an embodiment of the present invention is shown in FIG. 1. The cap assembly 10 is molded as a single piece of a flexible plastic material using known molding techniques. The cap assembly 10 is elongated and hollow and includes a closed end 11 and an open end 12. A sidewall 13 extends between the closed end 11 and the open end 12. The sidewall 13 and closed end 11 form a cavity 14 open at the open end 12.

Figure 2A:
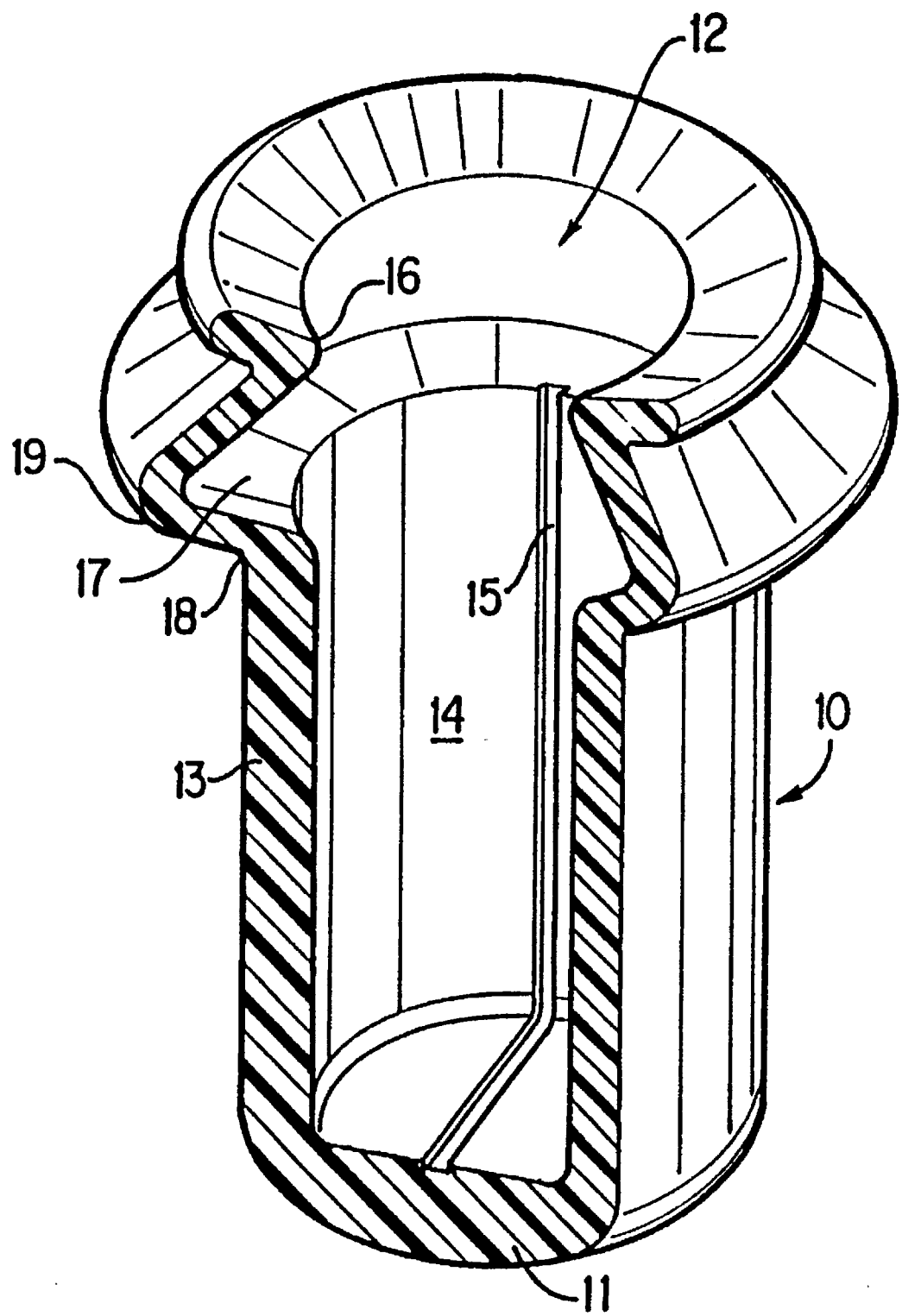
FIG. 2(A) is a cross-section along section line 2—2 of the venting cap assembly of FIG. 1.
Figure 2B:
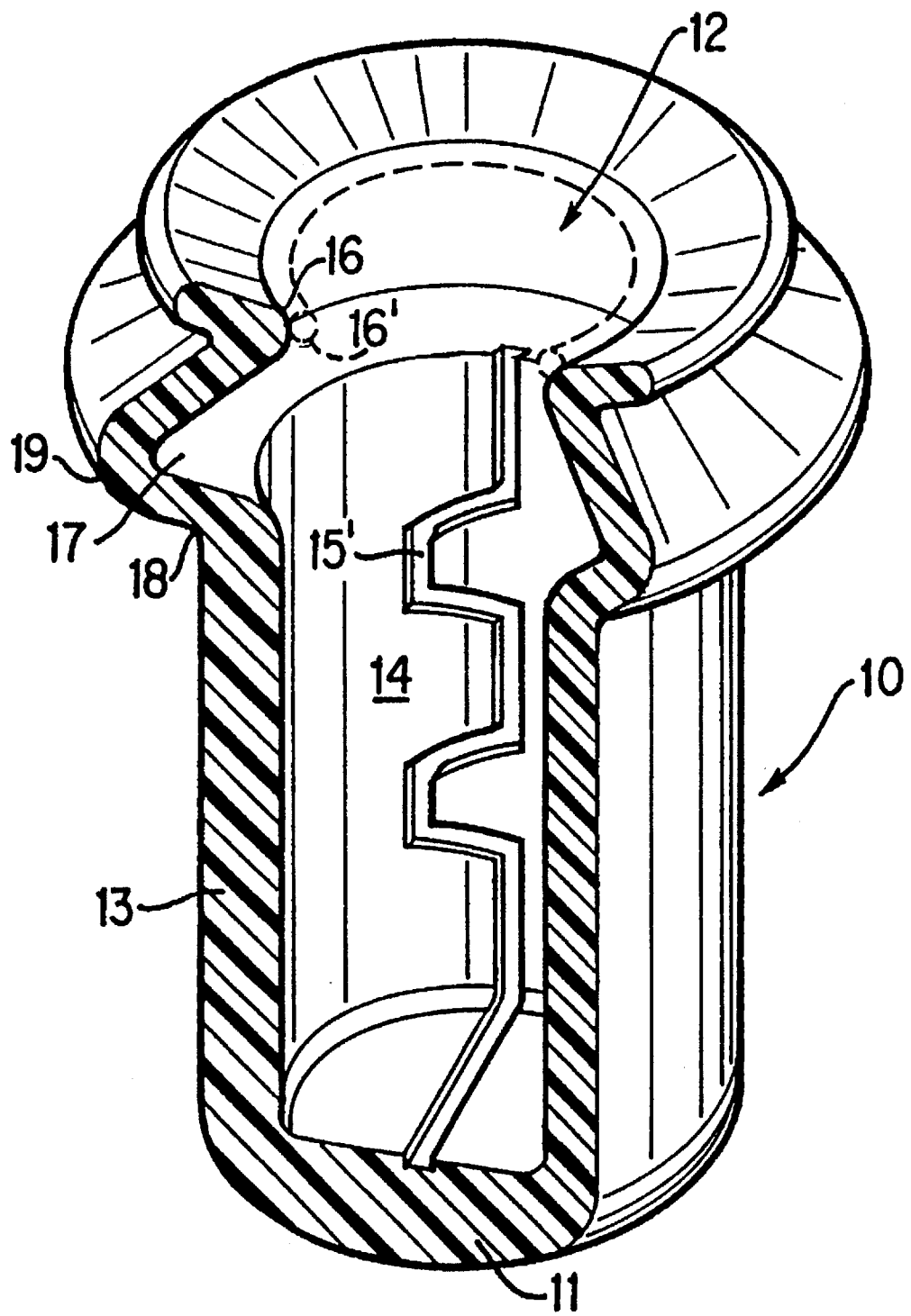
FIG. 2(B) is a cross-section view of another embodiment of a venting cap assembly according to the present invention.
Figure 2C:
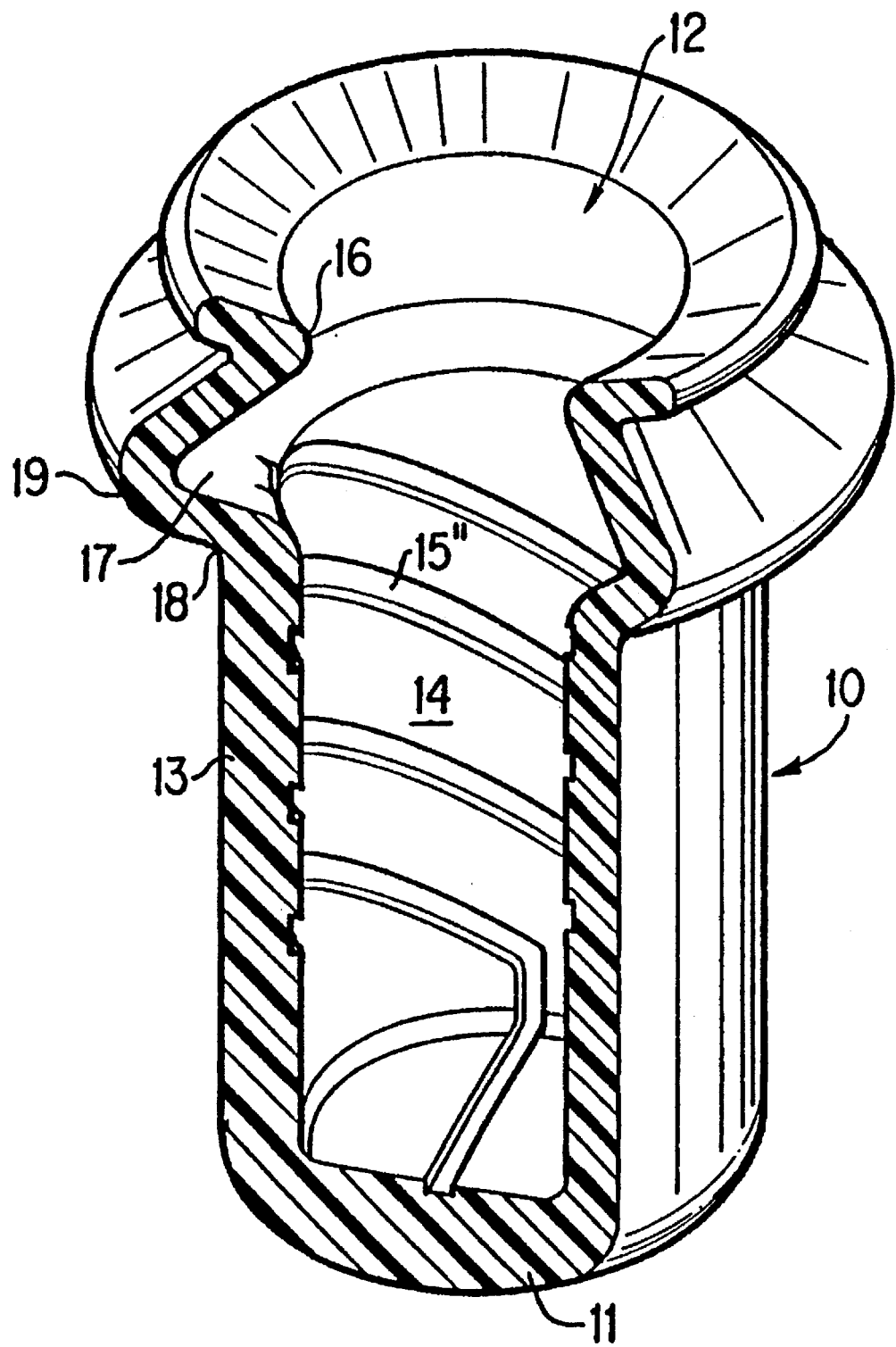
FIG. 2(C) is a cross-section view of another embodiment of a venting cap assembly according to the present invention.

The sidewall 13 includes at least one vent track 15, as shown in FIG. 2(A). The vent track 15 extends along the sidewall 13 and includes at least one side opening communicating with the cavity 14. The vent track 15 extends substantially parallel to the longitudinal axis of the cap assembly 10, as shown in FIG. 2(A). Alternatively, the vent track 15' may follow a tortuous path extending from the closed end 11 to the open end 12, as shown in FIG. 2(B). Alternatively, the vent rack 15" may follow a spiral path, as shown in FIG. 2(C). This tortuous or spiral arrangement would prevent any coating or contaminant from reaching an end of a component positioned within cavity 14 in the event that coating should leak into the vent track 15. The vent track 15 may also extend across the closed end 11, as shown in FIGS. 2(A)–(C). The vent track 15 permits excess air pressure that may build up in the cavity to travel toward the open end 12 for venting.

Figure 2D:
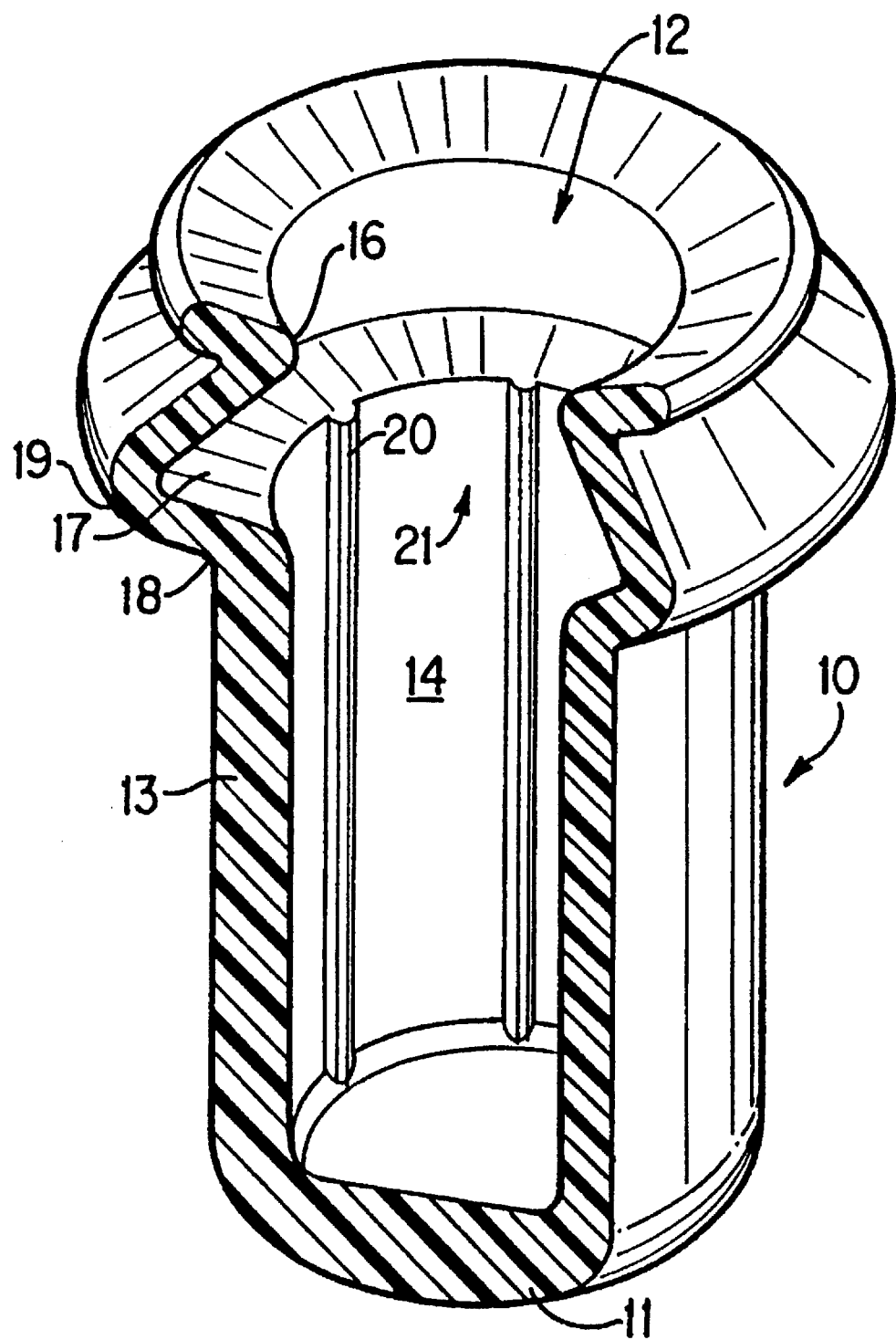
FIG. 2(D) is a cross-section view of another embodiment of a venting cap assembly according to the present invention.

Alternatively, the sidewall 13 may include at least one rib or projection 20, as shown in FIG. 2(D) that engages the component within the cavity 14. A vent track 21 is formed adjacent the at least one rib 20.

The cap assembly 10 also includes a sealing and venting membrane or member 16 positioned adjacent the open end 12. The member 16 is formed by an inwardly extending ridge portion of the sidewall 13. Additionally, the member 16 may comprise a bead 16' shown in phantom in FIG. 2(B) that extends into the interior cavity 14 and releasably engages the component positioned within the cavity 14. The member 16 prevents coating material and other contaminants from entering the cavity 14. The member 16 flexes to relieve pressure build-up within the cap assembly 10 to prevent blow-off.

The cap assembly 10 includes a pressure reservoir 17 positioned adjacent the sealing and venting member 16, as shown in FIG. 2. The pressure reservoir 17 is formed from an expanded portion of the sidewall 13. The at least one vent track 15 terminates at the pressure reservoir 17. This arrangement permits air to move through the vent track 15 into the pressure reservoir 17. The air collects in the pressure reservoir 17 until a predetermined air pressure is achieved. The sealing and venting member 16 then expands to release the air. The member 16 then closes after the air is released. This action prevents air from reentering the component and cap assembly 10.

The sidewall 13 of the cap assembly 10 includes a primary pressure pivot 18 and a secondary pressure pivot 19. The pressure pivots 18 and 19 are located adjacent the pressure reservoir 17 and prevent air and other contaminants from entering the cap assembly 10. The operation of the pressure pivots 18 and 19 will be described in detail below.

Figure 3:
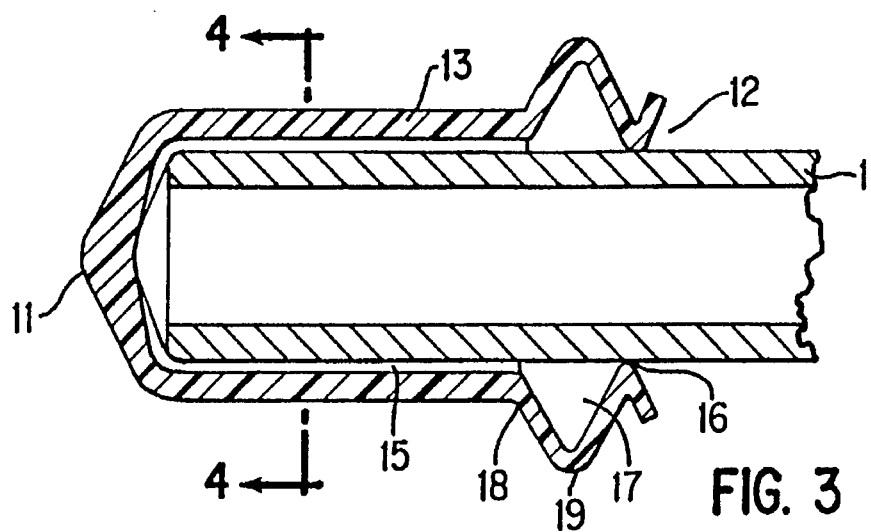
FIG. 3 is a side view of the venting cap assembly attached to an end of an object in a sealed position.
Figure 4:
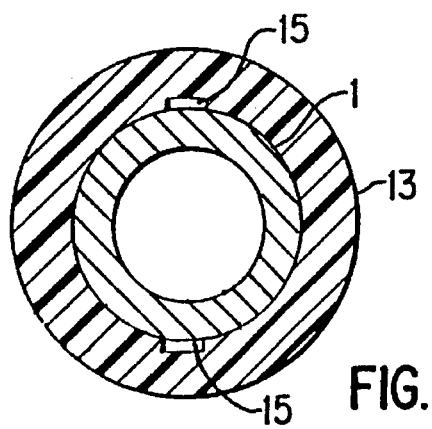
FIG. 4 is a cross-section along section line 4—4 of the venting cap assembly of FIG. 3.
Figure 5:
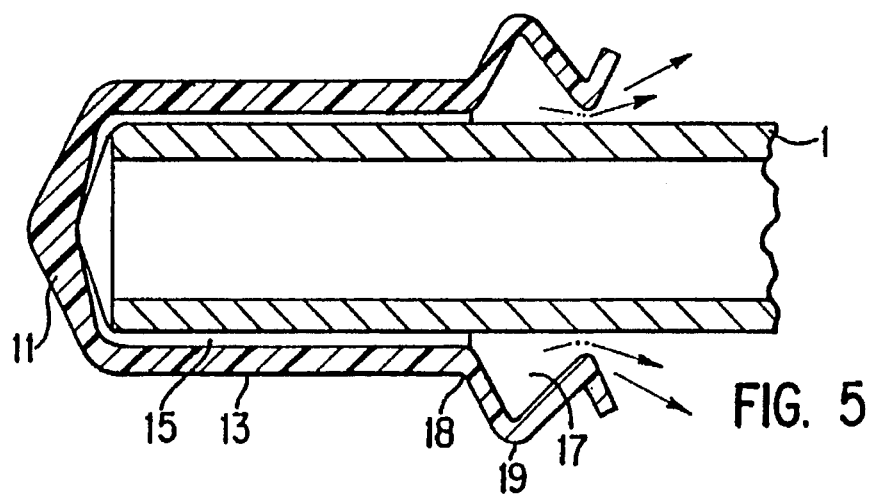
FIG. 5 is a side view of the venting cap assembly attached to the end of the object in an air release position.

The operation of the cap assembly 10 will be described in connection with FIGS. 3–5. The specific part 1 of the component is inserted into the cavity 14, as shown in FIG. 3. The sidewall 13 engages the specific part 1 to create a snug interference fit, as shown in FIG. 4. The at least one vent track 15 extends along a portion of the specific part 1, as shown in FIGS. 3–5. The sealing and venting member 16 creates a light interference fit with the specific part 1, as shown in FIG. 3.

The coating operation is often performed at high temperatures. The air within the specific part 1 expands in response to this increase in temperature. The air travels through the at least one vent track 15 to the pressure reservoir 17. The air pressure within the pressure reservoir 17 increases prior to venting.

The sealing and venting member 16 expands, as shown in FIG. 5, to release the build-up of air pressure within the pressure reservoir 17. Upon venting, the sealing and venting member 16 contracts and reengages the specific part 1. The periodic release of air with the release of the sealing and venting member 16 prevents the build-up of excessive air pressure within the cap assembly 10 and eliminates cap assembly blow-off.

During the cooling operation, the temperatures within the cap assembly 10 and the specific part 1 decrease. This decrease in temperature produces a negative air pressure due to the contraction of the air within the cap assembly 10 and specific part 1. In the prior art venting cap assemblies, the negative air pressure acts to draw coating material and other contaminants onto the specific part 1.

In the present invention, the pressure reservoir 17 collapses in response to the negative pressure. The sealing and venting member 16 remains engaged with the specific part 1. This prevents coating material and other contaminants from leaking onto the specific part 1. The sidewall 13 pivots about primary and secondary pressure pivots 18 and 19 to collapse the pressure reservoir toward the specific part 1. The pivoting of the pressure pivots 18 and 19 also serves to increase the seal between the sealing and venting member 16 and the specific part 1. The primary and secondary pressure pivots 18 and 19 also pivot when the sealing and venting member 16 expands to release the build-up of air pressure.

With the above described arrangement, the venting cap assembly 1 functions as a one way valve. The build-up of excess air pressure can escape through the expansion of the sealing and venting member 16. Coating material and other contaminants, however, are prevented from entering the cap assembly 10 and the specific part 1 by the engagement of the member 16 with the specific part. Thus, blow-off and leakage are prevented.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined by the following claims.

What is claimed is:

1. A venting cap for securing to a specific part of a component, comprising:

a closed first end;

an open second end;

a sidewall having an interior face extending between said closed first end and said open second end, wherein said closed first end and said sidewall form an interior cavity that receives the specific part;

at least one vent track on the interior face of said sidewall and extending along at least a portion of said sidewall;

a sealing and venting assembly adjacent said open second end; and a pressure reservoir that receives excess air pressure from the specific part and said interior cavity positioned adjacent said sealing and venting assembly;, wherein said at least one vent track terminates at said pressure reservoir and said sealing and venting assembly releasably engages said specific part such that upon a build-up of air pressure within said venting cap said sealing and venting assembly is momentarily released from engagement with said specific part to release excess air pressure within said interior cavity and said specific part.

2. The venting cap according to claim 1, further comprising a pressure assembly that presses said venting and sealing assembly against the specific part.

3. The venting cap according to claim 2, wherein said pressure assembly presses said venting and sealing assembly against the specific part when a negative air pressure develops in said interior cavity.

4. The venting cap according to claim 3, wherein said pressure assembly includes a primary pressure pivot and a secondary pressure pivot, whereby a portion of said sidewall pivots about said primary pressure pivot and said secondary pressure pivot to press said venting and sealing assembly against the specific part.

5. The venting cap according to claim 4, wherein said primary pressure pivot and said secondary pressure pivot are positioned adjacent said pressure reservoir.

6. The venting cap according to claim 5, wherein said primary and secondary pressure pivots pivot when said sealing and venting assembly is momentarily released from engagement with the specific part.

7. The venting cap according to claim 1, wherein said at least one vent track opens into said interior cavity.

8. The venting cap according to claim 7, wherein said at least one vent track extends substantially parallel to a longitudinal axis of said venting cap.

9. The venting cap according to claim 7, wherein said at least one vent track extends in a tortuous path along said sidewall.

10. The venting cap according to claim 7, wherein said at least one vent track extends in a spiral path along said sidewall.

11. The venting cap according to claim 1, wherein said at least one venting track extends across said closed end.

12. The venting cap according to claim 1, wherein said at least one venting track is formed by at least one rib positioned on said sidewall extending into said cavity.

13. The venting cap according to claim 1, wherein said sealing and venting assembly includes a bead projecting into said interior cavity.

14. The venting cap according to claim 1, wherein said sealing and venting assembly includes an inwardly extending ridge.

15. The venting cap according to claim 1, wherein said sidewall forms a snug interference fit with the specific part when the specific part is inserted into said interior cavity.

16. The venting cap according to claim 1, wherein said venting cap is formed from a plastic material.

* * * * *